UNITED STATES PATENT OFFICE.

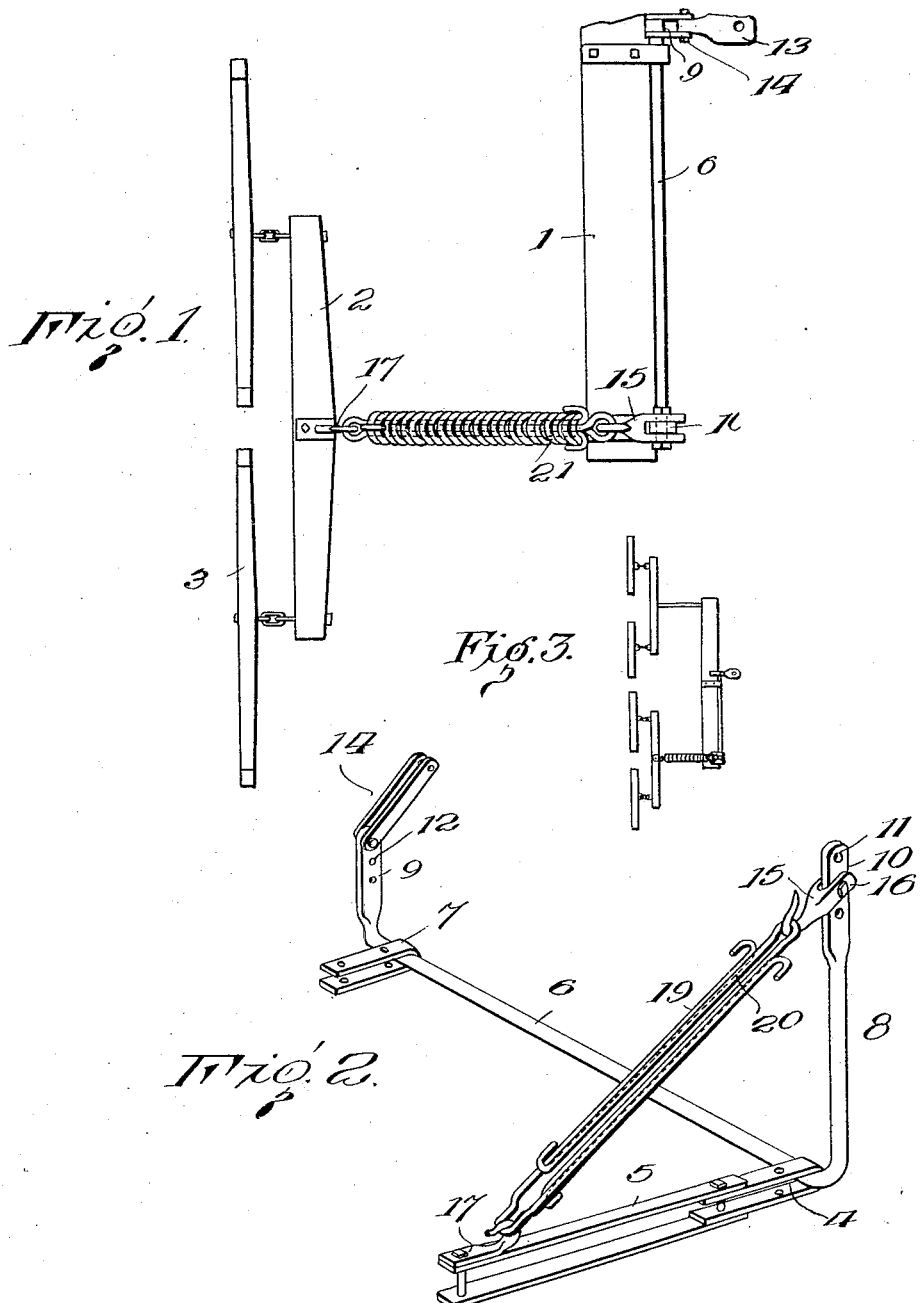

DANIEL WINDHORST, OF RUSKIN, NEBRASKA.

DRAFT-EQUALIZER.

1,332,701.  Specification of Letters Patent.  Patented Mar. 2, 1920.

Application filed July 28, 1917. Serial No. 183,345.

*To all whom it may concern:*

Be it known that I, DANIEL WINDHORST, a citizen of the United States, and resident of Ruskin, in the county of Nuckolls and State of Nebraska, have invented certain new and useful Improvements in Draft-Equalizers, of which the following is a specification.

This invention relates to new and useful improvements in draft equalizers and more specially for a draft equalizer applicable for a four horse team, and the primary object of the invention is to provide a simple and efficient device of this character, which will distribute the pull, so as to obviate the necessity of continually changing the horses or team so as to redistribute the pull for various horses or teams under varying conditions.

Another object of the invention is to provide a draft equalizer of this character, which includes a resilient connection between the main draft bar, and vehicle, which is adjustable, so as to vary the tension of the device as desired.

A further object of the invention is to provide a device of this character which is easily and simply constructed, inexpensive to manufacture, and one which will be very efficient in operation.

With these and numerous objects in view, my invention consists of the novel features of construction, combination, and arrangement of parts which will be herein referred to and more particularly pointed out in the specification and claims.

In the accompanying drawings:

Figure 1 is a top plan view of the draft equalizer applied; and

Fig. 2 is a perspective view of the device.

Fig. 3 is a top plan view of a draft bar having the improved structure associated therewith.

In describing my invention, I shall refer to the drawings in which similar reference characters designate corresponding parts throughout the several views.

The numeral 1 designates one end portion of the main draft bar of the device having pivotal connection with the vehicle or other load, which has connected therewith a double tree 2, which is connected with the conventional type of swingletrees 3. The connection between the main draft bar, and double tree comprising metal straps, one strap 4 being bent around the end of the main draft bar, and having its bent portion spaced therefrom, while a pair of connecting straps that form links 5 extend from the ends of the strap 4, and are connected with the double tree intermediate the ends of the same. A second doubletree will be connected with the second end portion of the draft bar in any desired manner as it is only necessary to have the structure of Fig. 2 at one end of the draft bar.

The draft equalizer proper comprises a substantially U-shaped bracket 6, which has its base portion pivotally connected with the rear edge of the main draft bar 1, by having one end positioned through the spaced bent portion of the strap 4 and the other end secured thereto by a bent metal strap 7, that is positioned intermediate the ends of said main draft bar. This U-shaped bracket is normally held in upright position, and the arms 8 and 9 thereof, are of different lengths, the arm 8 being the longer, and having the extremity thereof flattened as shown at 10, and being provided with a plurality of apertures 11 extending therefrom. The extremity of the shorter arm 9 is likewise flattened and provided with a plurality of apertures 12 for a purpose to be hereinafter more fully described.

The short arm 9 of the pivoted U-shaped bracket 6 is adapted to be connected with a clevis 13 of any desired type of vehicle, by means of connecting links 14. Owing to the plurality of apertures 12 in the end of the arm, it is obvious that this connection is adjustable, so as to adjust the pull of the device.

The extremity of the long arm 8 of the bracket 6 has a hook 15 provided with a bifurcated portion, which is adapted to straddle the flattened extremity of the arm and is connected therewith by a bolt 16, which extends through any of the apertures 11 in the end of said arm. The hook 15 is adjustable, as the fastening bolt may be withdrawn and placed in any of the openings through the arm as desired, so as to vary the height of the hook. A hook 17 is positioned on the outer end of the upper connecting strap or link 5, at the connection of the same with the double tree 2. Connected with hooks 15 and 17, are pairs of metal rods 19 and 20, which are bent intermediate their ends, with the extremities having hooks formed thereon, and positioned between said hooks when the rods are disposed as clearly shown in Fig. 2 of the drawings, is a coiled spring 21, which forms the tension means of the device. These projecting rods will serve to strengthen the spring 21 and also to hold the same in normal position. The spring will hold the pivoted bracket 6.

In operation, when the various parts of the device are assembled, as clearly shown in the Fig. 1 of the drawings, the extremity of the shorter arm 9 is connected with the clevis of a plow or the like, by means of the short links 14. It is obvious, that when a pull is placed on the main bar 1, which is connected with the double trees, there will be a tendency between the arm 9, and link 14 to straighten out, and hence the spring 21 will be placed under a tension. The plurality of apertures at the opposite ends of the movable bracket 6 permit the device to be adjusted as the link 14, and hook 15 may be moved up or down as desired on the arms 8 and 9 respectively.

When the device is in operation, owing to the equal distribution of the pull, each horse will have plenty of room to walk straight, and thus pull straight and not obliquely. The device is very compact, owing to the extreme simplicity of parts, and the arrangement of the spring and bracket, and occupies a very small amount of space, so it will not interfere in any manner with the driving. This type of draft equalizer is applicable to various other teams besides four horse teams, but it is especially constructed for that use.

From the above description taken in connection with the accompanying drawings, it is thought that a clear and comprehensive understanding of the construction, operation and advantages of my invention may be had, and while I have shown and described the device as embodying a specific structure, I desire to have it understood that such changes may be made in said structure as do not depart from the spirit and scope of the invention as claimed.

Having thus fully described my invention, what I claim as new, and desire to secure by Letters Patent, is:

1. In a draft equalizer, the combination with a main draft bar having double trees connected therewith, of an upright rotatably mounted bracket carried by the main draft bar, arms on the bracket, a connection between one of said arms and a clevis, and resilient means connected with the other of said arms and the double trees for the purpose set forth.

2. In a draft equalizer, the combination with a main draft bar having double trees connected therewith, of an upright substantially U-shaped bracket having its base portion pivotally mounted on the main draft bar, said bracket having arms of unequal length, a connection between the short arm and a clevis, and a tension spring connecting the extremity of the long arm and one of the double trees.

In testimony whereof I affix my signature hereto.

DANIEL WINDHORST.